(12) United States Patent
Jaenisch et al.

(10) Patent No.: US 11,341,235 B2
(45) Date of Patent: May 24, 2022

(54) ANOMALY DETECTION WITH ADAPTIVE AUTO GROUPING

(71) Applicant: Raytheon Company, Waltham, MA (US)

(72) Inventors: Holger M. Jaenisch, Toney, AL (US); James W. Handley, Decatur, AL (US)

(73) Assignee: Raytheon Company, Waltham, MA (US)

( * ) Notice: Subject to any disclaimer, the term of this patent is extended or adjusted under 35 U.S.C. 154(b) by 551 days.

(21) Appl. No.: 16/281,922

(22) Filed: Feb. 21, 2019

(65) Prior Publication Data

US 2020/0272731 A1    Aug. 27, 2020

(51) Int. Cl.
| G06F 21/54 | (2013.01) |
| G06F 21/55 | (2013.01) |
| G06F 21/56 | (2013.01) |

(52) U.S. Cl.
CPC ............ *G06F 21/54* (2013.01); *G06F 21/552* (2013.01); *G06F 21/554* (2013.01); *G06F 21/566* (2013.01)

(58) Field of Classification Search
CPC ...... G06F 21/54; G06F 21/552; G06F 21/554; G06F 21/556
See application file for complete search history.

(56) References Cited

U.S. PATENT DOCUMENTS

| 6,760,032 B1 | 7/2004 | James |
| 7,036,016 B1 | 4/2006 | Smith, Jr. |
| 8,301,387 B2 | 10/2012 | Hwa et al. |
| 8,839,417 B1 | 9/2014 | Jordan |
| 9,245,116 B2 | 1/2016 | Evans et al. |
| 10,076,273 B2 | 9/2018 | Berckmans et al. |
| 10,110,629 B1 | 10/2018 | Kruse et al. |
| 10,326,796 B1 | 6/2019 | Varadarajan et al. |
| 10,507,973 B2 | 12/2019 | Park |

(Continued)

FOREIGN PATENT DOCUMENTS

| EP | 2942919 A1 | 11/2015 |
| WO | WO-2019199675 A1 | 10/2019 |

(Continued)

OTHER PUBLICATIONS

"International Application Serial No. PCT/US2019/026338, International Search Report dated Jun. 21, 2019", 5 pgs.

(Continued)

*Primary Examiner* — Paul E Callahan
(74) *Attorney, Agent, or Firm* — Schwegman Lundberg & Woessner, P.A.

(57) ABSTRACT

A method of identifying anomalous behavior can include determining a first feature value and a second feature value of a series of numbers, identifying whether the determined first and second feature values map to a cell that is a part of a group based on spatial voting (SV) grid data, the SV grid data indicating an extent of each cell in a grid of cells, a number of rows and columns of cells in a group of cells, and, for each group of cells, a point in the center cell of the group of cells and a unique group number, and in response to identifying that the determined first and second feature values do not map to a cell of the grid of cells that is a part of a group, tagging the first and second feature values as corresponding to an anomalous behavior.

20 Claims, 9 Drawing Sheets

(56) References Cited

U.S. PATENT DOCUMENTS

| | | | |
|---|---|---|---|
| 10,521,584 | B1 | 12/2019 | Sharifi Mehr |
| 10,929,722 | B2* | 2/2021 | Cheng ................ G06K 9/00536 |
| 10,937,465 | B2 | 3/2021 | Jaenisch et al. |
| 11,036,858 | B2 | 6/2021 | Chistyakov et al. |
| 11,132,923 | B2 | 9/2021 | Jaenisch et al. |
| 2003/0084349 | A1 | 5/2003 | Friedrichs et al. |
| 2003/0174895 | A1 | 9/2003 | Hsieh |
| 2006/0009956 | A1 | 1/2006 | Winckel et al. |
| 2006/0101516 | A1 | 5/2006 | Sudaharan et al. |
| 2007/0245119 | A1 | 10/2007 | Hoppe |
| 2009/0241006 | A1 | 9/2009 | Liikanen et al. |
| 2010/0064370 | A1 | 3/2010 | Chamley et al. |
| 2011/0238855 | A1 | 9/2011 | Korsunsky et al. |
| 2012/0240185 | A1 | 9/2012 | Kapoor et al. |
| 2013/0145465 | A1 | 6/2013 | Wang et al. |
| 2015/0026582 | A1 | 1/2015 | Basak |
| 2015/0100556 | A1 | 4/2015 | Sekiguchi et al. |
| 2015/0131796 | A1 | 5/2015 | Milsted |
| 2015/0154796 | A1 | 6/2015 | Co |
| 2015/0206315 | A1 | 7/2015 | Price et al. |
| 2015/0295907 | A1 | 10/2015 | Abrahamson |
| 2016/0321323 | A1 | 11/2016 | Gaumnitz et al. |
| 2016/0359685 | A1 | 12/2016 | Yadav et al. |
| 2016/0359886 | A1 | 12/2016 | Yadav et al. |
| 2017/0149787 | A1 | 5/2017 | Niemela et al. |
| 2017/0257396 | A1 | 9/2017 | Shen et al. |
| 2017/0302691 | A1 | 10/2017 | Singh et al. |
| 2017/0310690 | A1 | 10/2017 | Mestha et al. |
| 2017/0327890 | A1 | 11/2017 | Saint-andre et al. |
| 2018/0027004 | A1 | 1/2018 | Huang et al. |
| 2018/0085011 | A1 | 3/2018 | Ma et al. |
| 2018/0160905 | A1 | 6/2018 | Wang et al. |
| 2018/0204111 | A1 | 7/2018 | Zadeh et al. |
| 2018/0337935 | A1 | 11/2018 | Marwah et al. |
| 2019/0018375 | A1 | 1/2019 | Deshpande et al. |
| 2019/0149565 | A1 | 5/2019 | Hagi et al. |
| 2019/0180181 | A1 | 6/2019 | Lilley |
| 2019/0196746 | A1 | 6/2019 | Fujimoto et al. |
| 2019/0279112 | A1 | 9/2019 | Jaenisch et al. |
| 2019/0289034 | A1 | 9/2019 | Erez et al. |
| 2019/0296913 | A1 | 9/2019 | Verma et al. |
| 2019/0311120 | A1 | 10/2019 | Jaenisch et al. |
| 2019/0312908 | A1 | 10/2019 | Jaenisch et al. |
| 2019/0383874 | A1 | 12/2019 | Jaenisch et al. |
| 2020/0202749 | A1 | 6/2020 | Jaenisch et al. |
| 2020/0204574 | A1 | 6/2020 | Christian |
| 2020/0273499 | A1 | 8/2020 | Jaenisch et al. |
| 2020/0326695 | A1 | 10/2020 | Jaenisch et al. |
| 2020/0362334 | A1 | 11/2020 | Regev et al. |
| 2021/0027171 | A1 | 1/2021 | Jaenisch et al. |
| 2021/0060858 | A1 | 3/2021 | Rakshit |

FOREIGN PATENT DOCUMENTS

| | | | |
|---|---|---|---|
| WO | WO-2019199769 | A1 | 10/2019 |
| WO | WO-2019199777 | A1 | 10/2019 |
| WO | WO-2020172122 | A1 | 8/2020 |
| WO | WO-2020172124 | A1 | 8/2020 |
| WO | WO-2021016533 | A1 | 1/2021 |

OTHER PUBLICATIONS

"International Application Serial No. PCT/US2019/026338, Written Opinion dated Jun. 21, 2019", 7 pgs.
"International Application Serial No. PCT/US2019/026514, International Search Report dated Jul. 5, 2019", 5 pgs.
"International Application Serial No. PCT/US2019/026514, Written Opinion dated Jul. 5, 2019", 8 pgs.
"International Application Serial No. PCT/US2019/026522, International Search Report dated Jul. 8, 2019", 4 pgs.
"International Application Serial No. PCT/US2019/026522, Written Opinion dated Jul. 8, 2019", 5 pgs.
Farlow, Stanley, "The GMDH Algorithm of Ivakhnenko", The American Statistician, vol. 35, No. 4, (1981), 210-215.
Ferreira, Candida, "Gene Expression Programming in Problem Solving", Soft Computing and Industry, (2002), 635-653.
Ferreira, Candida, "Gene Expression Programming: A New Adaptive Algorithm for Solving Problems", Complex Systems, vol. 13, issue 2, (2001), 22 pgs.
Gabor, D, et al., "A Universal Non-linear filter, predictor and simulator which optimizes", The Institution of Electrical Engineers, Paper No. 3270 M, (1960), 422-435.
Ivakhnenko, A G, "Heuristic Self-Organization in Problems of Engineering Cybernetics", Automatica, vol. 6, (1969), 207-219.
Ivakhnenko, A G, et al., "The Review of Problems Solvable by Algorithms of the Group Method of Data Handling (GMDH)", Pattern Recognition and Image Analysis, vol. 5, No. 4, (1995), 527-535.
Jaenisch, H, et al., "Generalized information fusion and visualization using spatial voting and data modeling", Society of Photo-Optical Instrumentation Engineers SPIE Proceedings vol. 8756 No. 875609, (May 2013), 16 pgs.
Jaenisch, Holger, et al., "A novel application of data modeling for extracting mathematical ontologies and relationship matrix features from text documents", SPIE Defense + Commercial Sensing, (2005), 12 pgs.
Jaenisch, Holger, et al., "A robust regularization algorithm for polynomial networks for machine-learning", Proc. SPIE 8059, Evolutionary and Bio-Inspired Computation: Theory and Applications V, 80590A, (May 2011), 21 pgs.
Jaenisch, Holger, et al., "Autonomous Journaling Response Using Data Model LUTS", Proc. of SPIE vol. 7344, (2009), 11 pgs.
Jaenisch, Holger, "Converting data into functions for continuous wavelet analysis", Proceedings of SPIE—The International Society for Optical Engineering, (pp. 2-13), (2009), 13 pgs.
Jaenisch, Holger, "Data Modeling Applications in Space Science and Astronomy", PhD thesis, James Cook University (pp. 1-130 of 255 pages total), (2009), 130 pgs.
Jaenisch, Holger, "Data Modeling Applications in Space Science and Astronomy", PhD thesis, James Cook University (pp. 131-256 of 255 pages total), (2009), 126 pgs.
Jaenisch, Holger, et al., "Data Modeling for Change Detection of Inventory Flow and Instrument Calibration", Proceedings of SOLE, (2003), 10 pgs.
Jaenisch, Holger, et al., "Data Modeling for Fault Detection", MFPT, (2003), 10 pgs.
Jaenisch, Holger, et al., "Data Modeling for network dynamics", Proceedings of SPIE—The International Society for Optical Engineering, (2004), 12 pgs.
Jaenisch, Holger, et al., "Data Modeling for Predictive Behavior Hypothesis Formation and Testing", Proc. SPIE 6241, Data Mining, Intrusion Detection, Information Assurance, and Data Networks Security, (2006), 12 pgs.
Jaenisch, Holger, et al., "Data-modeling-enabled guidance, navigation, and control to enhance the lethality of interceptors against maneuvering targets", Proceedings of SPIE—The International Society for Optical Engineering • Mar. 2005, 13 pgs.
Jaenisch, Holger, et al., "Digital MicroArray Analysis for Digital Artifact Genomics", Cyber Sensing, (2013), 20 pgs.
Jaenisch, Holger, "Entropyology: Microarray Analysis Analogy for Digital Artifact Discrimination", Proceedings of SPIE, vol. 8359, (2012), 20 pgs.
Jaenisch, Holger, "Geospatial Feature Based Automatic Target Recognition (ATR) using data models", Proceedings vol. 7697, Signal Processing, Sensor Fusion, and Target Recognition XIX, (2010), 12 pgs.
Jaenisch, Holger, et al., "Insider Threat Detection Enabled by Converting User Applications into Fractal Fingerprints and Autonomously Detecting Anomalies", SPIE Proceedings vol. 8408, (2012), 22 pgs.
Jaenisch, Holger, et al., "Performance Comparison of the Prophecy (Forecasting) Algorithm in FFT Form for Unseen Feature and Time-Series Prediction", Proc. SPIE 8757, Cyber Sensing, (2013), 30 pgs.

(56) References Cited

OTHER PUBLICATIONS

Jaenisch, Holger, et al., "Shai-Hulud the quest for worm sign", Proc. SPIE 5812, Data Mining, Intrusion Detection, Information Assurance, and Data Networks Security, (2005), 9 pgs.

Jaenisch, Holger, et al., "Spatial Voting for Automatic Feature Selection, Fusion and Visualization", Proc. SPIE 8756, Multisensor, Multisource Information Fusion: Architectures, Algorithms, and Applications, (2013), 21 pgs.

Jaenisch, Holger, "Spatial Voting with Data Modeling", Sensor Fusions and its Applications, (2010), 153-178.

Jaenisch, Holger, et al., "Virtual Instrument Prototyping with Data Modeling", (2003), 15 pgs.

Kamalika, Bhattacharjee, et al., "A Survey of Cellular Automata: Types, Dynamics, Non-uniformity and Applications", Arxiv.Org, Cornell University Library, 201 Olin Library Cornell University Ithaca, NY, (Jul. 8, 2016).

Oltean, Mihai, et al., "An autonomous GP-based system for regression and classi?cation problems", Applied Soft Computing 9, (2009), 49-60.

"U.S. Appl. No. 16/281,888, Examiner Interview Summary dated Aug. 10, 2020", 3 pgs.

"U.S. Appl. No. 16/281,888, Non Final Office Action dated May 19, 2020", 15 pgs.

"U.S. Appl. No. 16/281,888, Notice of Allowance dated Oct. 20, 2020", 12 pgs.

"U.S. Appl. No. 16/281,888, Response filed Aug. 18, 2020 to Non Final Office Action dated May 19, 2020", 10 pgs.

"U.S. Appl. No. 16/379,154, Examiner Interview Summary dated Jan. 8, 2021", 2 pgs.

"U.S. Appl. No. 16/379,154, Non Final Office Action dated Oct. 15, 2020", 25 pgs.

"U.S. Appl. No. 16/379,154, Response filed Jan. 14, 2021 to Non Final Office Action dated Oct. 15, 2020", 10 pgs.

"U.S. Appl. No. 16/379,162, Non Final Office Action dated Nov. 10, 2020", 20 pgs.

"International Application Serial No. PCT/US2019/026338, International Preliminary Report on Patentability dated Oct. 22, 2020", 9 pgs.

"International Application Serial No. PCT/US2019/026514, International Preliminary Report on Patentability dated Oct. 22, 2020", 7 pgs.

"International Application Serial No. PCT/US2019/026522, International Preliminary Report on Patentability dated Oct. 22, 2020", 7 pgs.

"International Application Serial No. PCT/US2020/018570, International Search Report dated Apr. 28, 2020", 4 pgs.

"International Application Serial No. PCT/US2020/018570, Written Opinion dated Apr. 28, 2020", 7 pgs.

"International Application Serial No. PCT/US2020/018574, International Search Report dated Apr. 28, 2020", 4 pgs.

"International Application Serial No. PCT/US2020/018574, Written Opinion dated Apr. 28, 2020", 7 pgs.

"International Application Serial No. PCT/US2020/043434, International Search Report dated Oct. 16, 2020", 4 pgs.

"International Application Serial No. PCT/US2020/043434, Written Opinion dated Oct. 16, 2020", 5 pgs.

Deng, Song, et al., "Distributed intrusion detection based on hybrid gene expression programming and cloud computing in a cyber physical power system", IET Control Theory And Applications, The Institution of Engineering and Technology, GB, vol. 11, No. 11, (Jul. 14, 2017), 1822-1829.

Elsayed, Saber, et al., "Evaluating the performance of a differential evolution algorithm in anomaly detection", IEEE Congress on Evolutionary Computation (CEC), IEEE, (May 25, 2015), 2490-2497.

Holnglei, Gao, et al., "A GEP-Based Anomaly Detection Scheme in Wireless Sensor Networks", Computational Science and Engineering, CSE '09. International Conference On, IEEE, Piscataway, NJ, USA, (Aug. 29, 2009), 817-822.

"U.S. Appl. No. 16/265,526, Examiner Interview Summary dated Sep. 23, 2021", 2 pgs.

"U.S. Appl. No. 16/265,526, Non Final Office Action dated Jul. 12, 2021", 16 pgs.

"U.S. Appl. No. 16/265,526, Response filed Oct. 11, 2021 to Non Final Office Action dated Jul. 12, 2021", 9 pgs.

"U.S. Appl. No. 16/281,888, Corrected Notice of Allowability dated Jan. 27, 2021", 2 pgs.

"U.S. Appl. No. 16/379,154, Advisory Action dated Aug. 30, 2021", 6 pgs.

"U.S. Appl. No. 16/379,154, Amendment & Response Under 37 C.F.R. § 1.116 filed Sep. 29, 2021", 11 pgs.

"U.S. Appl. No. 16/379,154, Final Office Action dated Apr. 29, 2021", 32 pgs.

"U.S. Appl. No. 16/379,154, Response filed Jul. 29, 2021 to Final Office Action dated Apr. 29, 2021", 11 pgs.

"U.S. Appl. No. 16/379,162, Examiner Interview Summary dated Feb. 12, 2021", 2 pgs.

"U.S. Appl. No. 16/379,162, Notice of Allowance dated May 26, 2021", 11 pgs.

"U.S. Appl. No. 16/379,162, Response filed Feb. 10, 2021 to Non Final Office Action dated Nov. 10, 2020", 8 pgs.

"U.S. Appl. No. 16/379,162, Supplemental Notice of Allowability dated Aug. 18, 2021", 3 pgs.

"U.S. Appl. No. 16/381,179, Examiner Interview Summary dated Sep. 30, 2021", 2 pgs.

"U.S. Appl. No. 16/381,179, Non Final Office Action dated Jun. 25, 2021", 10 pgs.

"U.S. Appl. No. 16/381,179, Response filed Sep. 27, 2021 to Non Final Office Action dated Jun. 25, 2021", 10 pgs.

"U.S. Appl. No. 16/522,235, Examiner Interview Summary dated Nov. 10, 2021", 2 pgs.

"U.S. Appl. No. 16/522,235, Final Office Action dated Nov. 30, 2021", 15 pgs.

"U.S. Appl. No. 16/522,235, Non Final Office Action dated Aug. 16, 2021", 11 pgs.

"U.S. Appl. No. 16/522,235, Response filed Nov. 16, 2021 to Non Final Office Action dated Aug. 16, 2021", 9 pgs.

"International Application Serial No. PCT/US2020/018570, International Preliminary Report on Patentability dated Sep. 2, 2021", 9 pgs.

"International Application Serial No. PCT/US2020/018574, International Preliminary Report on Patentability dated Sep. 2, 2021", 9 pgs.

U.S. Appl. No. 16/297,202, filed Mar. 8, 2019, Machine Learning Technique Selection and Improvement.

U.S. Appl. No. 16/265,526, filed Feb. 1, 2019, Device Behavior Anomaly Detection.

U.S. Appl. No. 16/379,154, filed Apr. 9, 2019, Cyber Chaff Using Spatial Voting.

U.S. Appl. No. 16/379,162, filed Apr. 9, 2019, Encryption Using Spatial Voting.

U.S. Appl. No. 16/381,179, filed Apr. 11, 2019, Behavior Monitoring Using Convolutional Data Modeling.

U.S. Appl. No. 16/522,235, filed Jul. 25, 2019, Gene Expression Programming.

U.S. Appl. No. 16/554,206, filed Aug. 28, 2019, Alternative Techniques for Design of Experiments.

U.S. Appl. No. 16/281,888, filed Feb. 21, 2019, Anomaly Detection With Reduced Memory Overhead.

* cited by examiner

BEHAVIOR TRANSITION MATRIX

TO

| FROM | GROUP 1 | GROUP 2 | GROUP 3 |
|---|---|---|---|
| GROUP 1 | 0.33 | 0.67 | 0 |
| GROUP 2 | 0.33 | 0.33 | 0.33 |
| GROUP 3 | 0 | 0 | 0 |

FIG. 7

ANOMALY DETECTION WITH ADAPTIVE AUTO GROUPING

TECHNICAL FIELD

Embodiments relate to computer or information security. Some embodiments regard identifying an anomaly in device operation, communication, or information content.

TECHNICAL BACKGROUND

Computer security is a difficult and important task. Computer security, cybersecurity, or information technology (IT) security is the protection of computer systems from theft or damage to their hardware, software, or electronic data, as well as from disruption or misdirection of the services they provide. The difficulty of implementing security increases on a memory or processor-restricted device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 illustrates, by way of example, a diagram of an embodiment of a behavior transition matrix.

DESCRIPTION OF EMBODIMENTS

Figure 1:
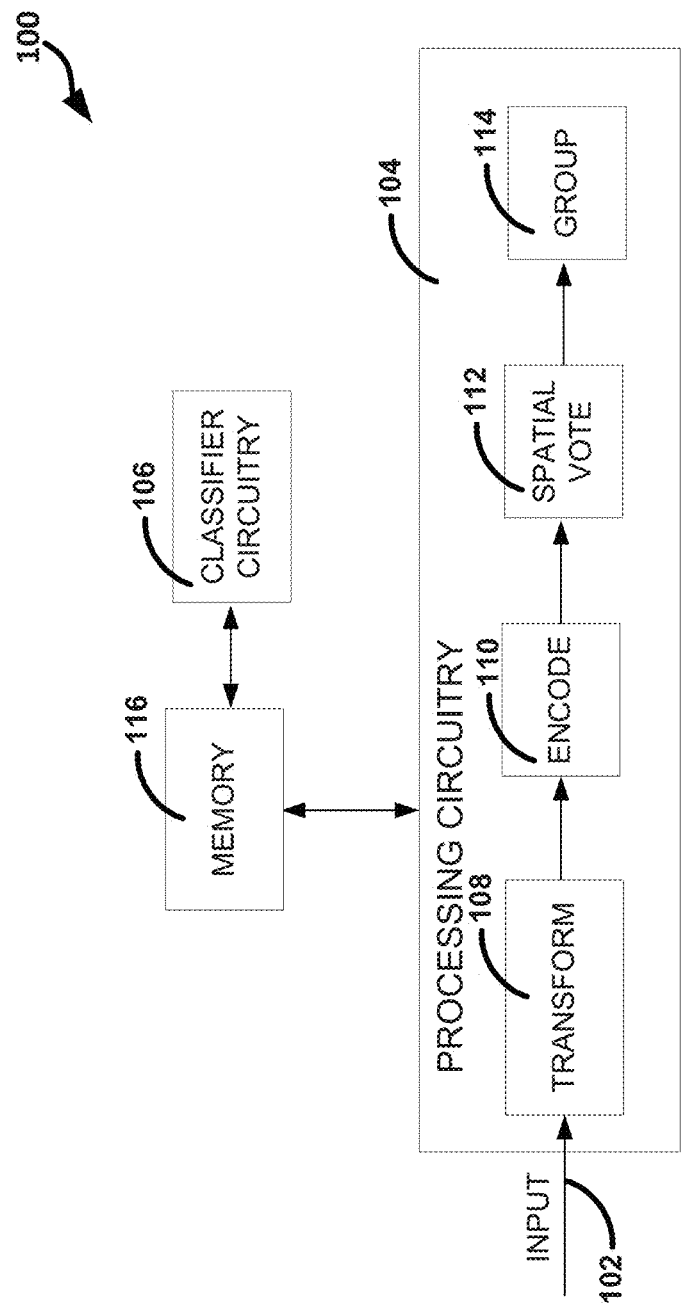
FIG. 1 illustrates, by way of example, a diagram of an embodiment of a system for anomaly detection.

Some embodiments relate to anomaly detection. An "anomaly", as used herein, means detected behavior not seen or experienced before from the perspective of the monitoring device. Embodiments can be agnostic to data type, format, source, or examples. Embodiments can be self-initializing, adaptive, and self-aware.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments can be embedded into firmware and driven by device communication including, but not limited to, sensor communications (e.g., voltages, currents, and any other physics-based parameters, as well as binary or digital data obtained from sensors), device communications between layers (e.g., physical, data link, medium access control (MAC), application, network, or the like), or device communication within a same layer. Embodiments can use Information Theoretic Methods (ITM) to achieve compressive sensing encoding of data streams, sequences, or packets. The encoding can be order sensitive to the input sequence. The encoding can provide a hash-like function with nearness, removing external definitions of similarity, or a requirement for nearest neighbor calculations.

This disclosure uses for an illustrative use case, but is not limited to, cyber event or network data. The disclosure further illustrates how numeric encoding of data enables adaptive Spatial Voting (SV) grids to automatically detect a cyber-attack event. Embodiments can use discrete mapping of two-dimensional (2-D) scatter plot information to establish a baseline pattern of populated grid cells. Comparison can be achieved by calculating the grid cell assignment for a newly encoded data item, and testing if the cell index value already exists in a dictionary, lookup table, or as defined by a group. If it does, the data item can be ignored as a minor variant or the same as something previously encountered. A vote or stack count associated with the cell (sometimes called a key value) can be incremented. The count can indicate how many inputs have been mapped to the cell. However, if the proposed new grid key value does not already exist in the dictionary or lookup table, or has otherwise not had an input mapped thereto, the data item can be declared anomalous and can be recorded in an anomaly storage file. A new grid key can be added to the recognized key dictionary or lookup table.

Monitoring changes, such as across epochs, provides an ability to detect anomalies in a wide variety of situations. Applications can include packet or other data detection in a network (e.g., thumb drive insertion and the launch of a bot in the associated network, bus anomaly detection, corrupt packet detection and initialization when running simulations, finding packet fragments drift errors message types, or the like), device (e.g., helicopter, missile, airplane (e.g., associated 1553b system messaging and control bus, or the like), automotive vehicle (e.g, Controller Area Network (CAN bus) messaging, control busses, or the like), truck, radar, satellite, appliance, phone, computer, sensor, internet of things (TOT) device, embedded device, or the other manned or unmanned device, software or firmware based firewalls, black list/white list processes, malware or malicious behavior detection processes, surveillance systems including passive and active electromagnetic (EM) and non-EM based systems including large scale systems such as power generation facilities, manufacturing facilities, remote monitoring Facilities and any operational system of systems that uses active or passive "controllers" as part of the operation and decision making process both with and without and operation error detection (e.g., vibration fault detection, data fault detection, system configuration change detection, high priority alert thinning to relevant anomalies, query information variety discovery and unique information detection, natural language processing (NLP), entry matching such as in a maintenance log or other log (e.g., to directly associate entries about a same item or even when different technicians use different abbreviations or descriptions but are discussing a common symptom or part), matching job descriptions to resumes, text matching (e.g., finding documents that relate to search example of interest even if key words are absent), predicting time to failure (e.g., by monitoring how often new anomalies are detected as indication of system status change to a new or worse steady state), relevant detection of changes in scenes or video streams, such as full motion video real time feeds or isolating subset of frames from blurry movies or image streams enabling high resolution enhancement, such as for deep sky astronomy showing better performance than using adaptive optics as well as surveillance imagery, lossless compression of data extracting minimum relevant sub sample if data is sufficient for a secondary or tertiary decision making process, fusing multiple information sources to rapidly enable situation awareness such as in multi-intelligence (INT) scenarios, among others.

This disclosure covers the encoding process, an SV grid generation method, how areas of regard are defined, and how areas of regard are used to declare and confirm events as they occur. Embodiments can provide an automated report. The report can be generated for an analyst. The report can isolate aspects of the behavior flagged as anomalous. The report can include a confidence interval and statistical test of significance, such as to isolate the behavior with relevant information.

Embodiments can operate based on a plurality of ITM arranged to enable anomaly detection. The techniques can operate without requiring training in the machine learning (ML) sense. Embodiments can leverage numeric compressive sensing statistical encoding of binary data into (x, y) (e.g., feature 1, feature 2) pairs reducing dimensionality from many to two (2) using SV grids.

Anomalies, as used herein, are defined as being "something never experienced before now". This definition inherently puts an order dependency or temporal component to the definition of anomaly.

A self-adapting SV grid can be enabled to auto adjust both its spatial extent and resolution. The adjustment can be driven by newly experienced encoded data. The first data item that creates a new grid cell "key value" can be identified and declared as anomalous. Any further data that encodes into an existing grid cell increases the stack count for the cell and is declared as recognized. These data can be deemed trivial variations of what has already been encountered. Such adaptive partitioning of data extracts relevant dynamic variants and yields what may be thought of as "margin points" or support vectors from support vector machine (SVM), but using a completely orthogonal and unrelated methodology.

In some embodiments, no use of "truth" labels is made. In various embodiments, grouping and partitioning is done using information theory. Some embodiments can use the encoded statistical estimators as (x, y) pairs. This is metaphorically similar to principal component 1 and principal component 2, but using none of the eigenvalue math/linear algebra principal component analysis (PCA) uses and obtaining the result in real-time. Various embodiments can be implemented on a multithreaded process, such as in a distributed parallel fashion. Various embodiments can be performed on an embedded device or other device with limited processor and memory bandwidth.

Reported events can include one or more anomalies. Runs of anomalies that fall more frequently outside a predicted area of regard region can signal a systemic persistent shift in observed system state and behavior, as opposed to intermittent spurious anomalies in recurring realms. These runs can correspond to important behavior changes and can be alerted.

In literature, anomalies are synonymous with "bad behaviors". This is occurring in ML since, by definition, ML methods rely on "optimization strategies" to define decision boundaries and create classifiers with targeted "equal error rate". These ML methods are subject to the limitations of both Wolpert's No Free Lunch Theorem (NFL) and the Ugly Duckling Theorem. This is because ML classifiers measure differences and distinctions between two or more things. Whenever such a comparison is made it reduces mathematically to a set of ratios. For a given numerical value, there are an infinite number of numerator and denominator combinations that result in the same numerical equivalent value making the ratio concept non-unique. Thus, methods that require differencing require 2 or more classes to find differences and by definition cannot discover fundamental ab-initio traits that have a physics-based meaning. Hence the ability to learn only 1 class "normal" is intractable. Rather than admitting the in-admissibility of ML as method for detecting "anomalies", the ML community has attempted to cheat the math by taking what is normal and creating "artificial" data, to turn a single class case into a contrived two-class case. The ML then proceeds by training. What is being learned is the differences between the normal data and the contrived data, which are very unlikely the same as the unknown-unknown data that has yet to be encountered, hence such classifiers when deployed suffer from at least two problems. These ML techniques make a class declaration (if 3 classes were trained on, one of the three will be declared no matter how unlikely they are, they simply report with a lower probability or confidence and the ML technique generally cannot return an "unknown" state). The need for confidences and probabilities leads to a third issue of having to set thresholds ad hoc and post hoc based on limited simulated testing and retesting upon failure. In all cases, a known equal error rate is minimized but specificity of one (e.g., no false positives) is not obtainable, hence it is known generally how many false positives to expect at best with no means of ferreting them out.

Truly detecting an unknown-unknown can be accomplished using context that is created in-situ as data is processed, thus yielding knowledge based on experience. The process can, upon organizing what has been seen into partitions of similar based on numeric binning, determine if the new data falls into an existing bin or not. If it does, it is not novel. If it does not, then it has never been encountered before and is declared an anomaly and worthy of further reconsideration in a post process or downstream inspection.

Some embodiments can include "self-aware" and fully adaptive processes. Self-awareness, as used herein, means defining self in terms of aggregate of experiences and an ability to discern a new stimulus as being either self or not self This self-awareness eliminates traditional training and need for labeled data, it provides data thinning to relevant cases, and enables self-supervised classifiers and detectors to be created and employed upstream of itself, filtering out with black/white list capability those things which have been encountered before to disregard them. The self-supervised classifier can generate labels of temporal group and key index values. The labels can be replaced with human interpretable grammar without requiring any change in the defined groupings and encoded mappings into such groups.

Embodiments enable an anomaly detection process to be sped up over time as the full range of system dynamics are encountered and yet remain sensitive to the new unknownunknowns. Embodiments can make a determination much faster than a k-means clustering technique used on the same data. First, embodiments include no training time. Second, embodiments include simpler, more cost-effective processing, eliminating the need for k-means clustering while autonomously partitioning data into groups that preserve similarity. Embodiments can eliminate the need for random selection of data starting points, eliminate the need to define the number of clusters to look for or attempt to assign the data to, and eliminate a subsequent Monte Carlo rerun and artificial monitoring for subjective convergence of cluster number and membership, all of which are required by k-means clustering techniques.

Innovative aspects can include, but are not limited to: reduced memory overhead, especially when using SV grids with undetermined or unlimited bounds; increased behavior detection capability by providing behavior transition matrices with very little overhead; and simplified group probability determination using a simplified Gaussian mixture model (GMM).

Various embodiments described herein provide streaming and real-time enabled anomaly detection of type and format agnostic data sets. Some embodiments include proven anomaly detection maintained while performance "throughput" and "stability of execution time" is improved. Various embodiments demonstrate that the system is fully adaptive and self-initializing requiring no a priori training data to function correctly.

FIG. 1 illustrates, by way of example, a diagram of an embodiment of a system 100 for anomaly detection. The system 100 as illustrated includes processing circuitry 104, classifier circuitry 106, and a memory 116. The processing circuitry 104 can identify an anomaly (a behavior that has not been seen by the processing circuitry 104 up to the point the behavior is seen). The classifier circuitry 106 can present the anomaly to a user for action, adjust SV grid parameters, or the like. The memory 116 can store key values, SV grid parameters, or other data input or output from the processing circuitry 104.

The processing circuitry 104 receives input 102. The input 102 can include binary data, text, signal values, image values, or other data that can be transformed to a number. The processing circuitry 104 can transform the input 102 to a number, at operation 108. The operation 108 can include encoding the input into a specified format, parsing the data into chunks (e.g., chunks of a specified size), or the like. For example, the operation 108 can include encoding text input to an American Standard Code for Information Interchange (ASCII) encoding to transform the input 102 into numbers between zero (0) and two hundred fifty-five (255). In another example, the operation 108 can include converting chunks of binary data to their numerical equivalent, such as two's complement, unsigned integer, floating number (e.g., short or long), or the like. In yet another example, the operation 108 can include performing an analog to digital conversion on analog signal data, such as by an analog to digital converter. In yet another example, the operation 108 can include combining red, green, blue (RGB) values of a color image, or the like, to generate a number. Not all input 102 needs to be transformed, thus the operation 108 is optional.

The processing circuitry 104 can receive numbers either as raw input 102 or from the operation 108 and encode the numbers into two features (discussed below) at operation 110. The operation 110 is order-sensitive, such that the same inputs received in a different order encode (likely encode) to different features.

Examples of features include RM, RS, SM, SS, TM, TS, OC1, OC2, and OCR (discussed below). These calculations are performed in the sequence shown so that they can be calculated in a single pass across the data element where a value derived by an earlier step is used in an antecedent step directly and all calculations are updated within a single loop. RM can be determined using Equation 1:

$$RM_i = (RM_{i-1} + X_i)/2 \qquad \text{Equation 1}$$

In Equation 1, $X_i$ is the ith input value for i=1, 2, ... n. RS can be determined using Equation 2:

$$RS_i = \left(RS_{i-1} + \sqrt{\frac{(X_i - RM_i)^2}{2}}\right)/2 \qquad \text{Equation 2}$$

SM can be determined using Equation 3:

$$SM_i = \Sigma X_i / n \qquad \text{Equation 3}$$

SS can be determined using Equation 4:

$$SS_i = \sqrt{(SS_{i-1} + (X_i - SM_i)^2)/(n-1)} \qquad \text{Equation 4}$$

TM can be determined using Equation 5:

$$TM_i = (TM_{i-1} + SM_{i-1})/2 \qquad \text{Equation 5}$$

TS can be determined using Equation 6:

$$TS_i = \left(TS_{i-1} + \sqrt{\frac{(X_i - TM_i)^2}{2}}\right)/2 \qquad \text{Equation 6}$$

Orthogonal component 1 (OC1) can be determined using Equation 7:

$$OC1_i = (RM_i + SM_i + TM_i)/3 \qquad \text{Equation 7}$$

Orthogonal component 2 (OC2) can be determined using Equation 8:

$$OC2_i = (RS_i + SS_i + TS_i)/3 \qquad \text{Equation 8}$$

Orthogonal component rollup (OCR) can be determined using Equation 9:

$$OCR_i = (OC1_i + OC2_i) \qquad \text{Equation 9}$$

There is no "best" encoding for all use cases (Ugly Duckling Theorem limitation). Each set of encoding features used as (x, y) pairs will yield a different but valid view of the same data, with each sensitive to a different aspect of the same data. "R" features tend to group and pull together, "S" features tend to spread out, "T" features tend to congeal data into fewer groups but sub groups tend to manifest with much more organized structure, and "OC" features tend to produce the most general spread of data. "OC" features most resemble PC1 and PC2 of traditional Principal Component Analysis (PCA) without the linear algebra for eigenvectors.

Each feature is now described in more detail with suggested application:

R-type feature—Associates data into closer, less spread groups, guaranteed to be bounded in SV data space if the encoding is bounded and the SV space is similarly bounded (e.g., if ASCII encoding is used and the x and y extent are bounded from [000]-[255]). R-type features are recommended when the dynamic variability in data is unknown (typically initial analysis). This can be refined in subsequent analysis. R-type features will tend to group data more than other features.

S-type feature—Tends to spread the data out more. How the encoded data spreads can be important, so things that stay together after spreading are more likely to really be similar. S-type features produce a potentially unbounded space. S-type features tend to spread data along one spatial grid axis more than another. Note, if the occupied cells in the SV spatial grid fall along a 45 degree line, then the 2 chosen stat types are highly correlated and are describing the same aspects of the data. When this occurs, it is generally suggested that one of the compressive encoding features be changed to a different one.

T-type feature—These compressive encoding features are sensitive to all changes, and are used to calculate running mean and running sigma exceedances. T-type features can provide improved group spreading over other features types. T-type features tend to spread data along both axes.

OC-type feature—Orthogonal Components, which are simple fast approximations to PCA (Principal Component Analysis). The OC1 component is the average of RM, SM, and TM, OC2 is the average of RS, SS, and TS, and OCR is the sum of OC1 OC2.

Note that while two variants of each type of feature are provided (e.g., RS and RM are each a variant of an R-type feature) cross-variants can provide a useful analysis of data items. For example, if an RS or RM is used as feature 1, any of the S-type features, T-type features, or OC-type features can also be used as feature 2. Further, two of the same feature can be used on different data. For example, TS on a subset of columns of data from a row in a comma separated values (CSV) data file can form a feature 1, while TS on the same row of data but using a different subset of columns can form a feature 2.

In some embodiments, one or more features can be determined based on length of a corresponding data item. The length-based features are sometimes called LRM, LRS, LSM, LSS, etc.

The features of Equations 1-9 are order-dependent. The features can be plotted against each other on a grid of cells, at operation 112. The processing circuitry 104 can initialize an SV grid to which the encoded inputs are mapped, such as at operation 112.

Plotted values can be associated or correlated, such as at operation 114. The operation 114 can include forming groups of mapped inputs and determining an extent thereof. More details regarding the operations 108-114 are provided in FIGS. 2-4.

The classifier circuitry 106 can provide a user with a report indicating behavior that is anomalous. An input mapped to a cell that was not previously populated is considered anomalous. If an input is mapped to a cell that already has an input mapped thereto by the features, the input can be considered "recognized" or known. Since some applications can be memory limited, an entity can opt to have few cells in an SV grid. For these cases, it can be beneficial to determine an extent that an encoded value is situated away from a center of a cell. If the encoded value is a specified distance away from the center or a center point (e.g., as defined by a standard deviation, variance, confidence ellipse, or the like), the corresponding data item can be considered anomalous. Such embodiments allow for anomaly detection in more memory-limited devices.

The classifier circuitry 106, in some embodiments, can indicate in the report that an input known to be malicious was received. The report can include the input, the group (if applicable) to which the cell is a member, a number of consecutive inputs, a last non-anomalous data item, a subsequent non-anomalous data-item, such as for behavioral analysis or training, or the like. The classifier circuitry 106 can indicate, in the report, different types of anomalies. For example, a type 1 anomaly can indicate a new behavior that falls within an area of regard (AOR). A type 2 anomaly can indicate a new behavior that falls outside of an area of regard. An area of regard can be determined based on one or more prior anomaly detection epochs. In a given epoch, there can be one or more areas of regard. An anomaly detection epoch is a user-defined interval of analyzing a number of inputs, a time range, or the like. The epoch can be defined in the memory 116 and monitored by the processing circuitry 104.

In some embodiments, an event for the report can include a single anomalous behavior. In some embodiments, an event for the report can be reported in response to a specified threshold number of type 2 anomalies.

The classifier circuitry 106 can adjust SV grid parameters. An initial size of an SV grid cell can be determined. In some embodiments, the initial size of the SV grid cell can include dividing the space between (0, 0) and the encoded (x, y) of the first input data item into an N×N SV grid, where N is the initial number of cells on a side of the SV grid (for example, a 16×16 SV grid would break up the distance in x and in y to the first data point from the origin into 16 equal divisions).

As new input data items are introduced and encoded, whenever one fall outside the extent of the SV grid, the N×N SV grid can be increased in size to (N+1)×(N+1) until either the new input data item is included on the resized SV grid, or N becomes equal to the maximum allowed number of SV grid cells on a side of the SV grid. After N becomes a defined maximum SV grid size (for example 64×64), and a new input data item falls off of the current SV grid, the size of each SV grid cell size can be increased so that the SV grid encompasses the new data point.

As either the number of SV grid cells on a side or the overall extent of the SV grid in x and y are increased to encompass new input data items, the SV grid column (Equation 14), SV grid row (Equation 15), and key index value (Equation 16) can be changed to map the populated SV grid cells from the previous SV grid to the newly size one. To accomplish this, the center (x, y) value of each populated SV grid cell can be calculated using the minimum and maximum x and y values and the number of SV grid cells in the previous SV grid, and then mapping the centers and their associated SV grid counts onto the new SV grid using Equations 14, 15, and 16. This is done using the following equations:

Row=int (Key Value/(number of cells on side))  Equation 10

Col=Key Value−int (Row*(number of cells on side))  Equation 11

Center 1=$x$ min+Col*($x$ range)/(num. col−1)  Equation 12

Center 2=$y$ min+Row*($y$ range)/(num. row−1)  Equation 13

The values for Center 1 and Center 2 can then be used in Equations 14, 15, and 16 as Feature 1 and Feature 2 to calculate the new Key Value for each populated cell on the new SV grid.

Figure 2:
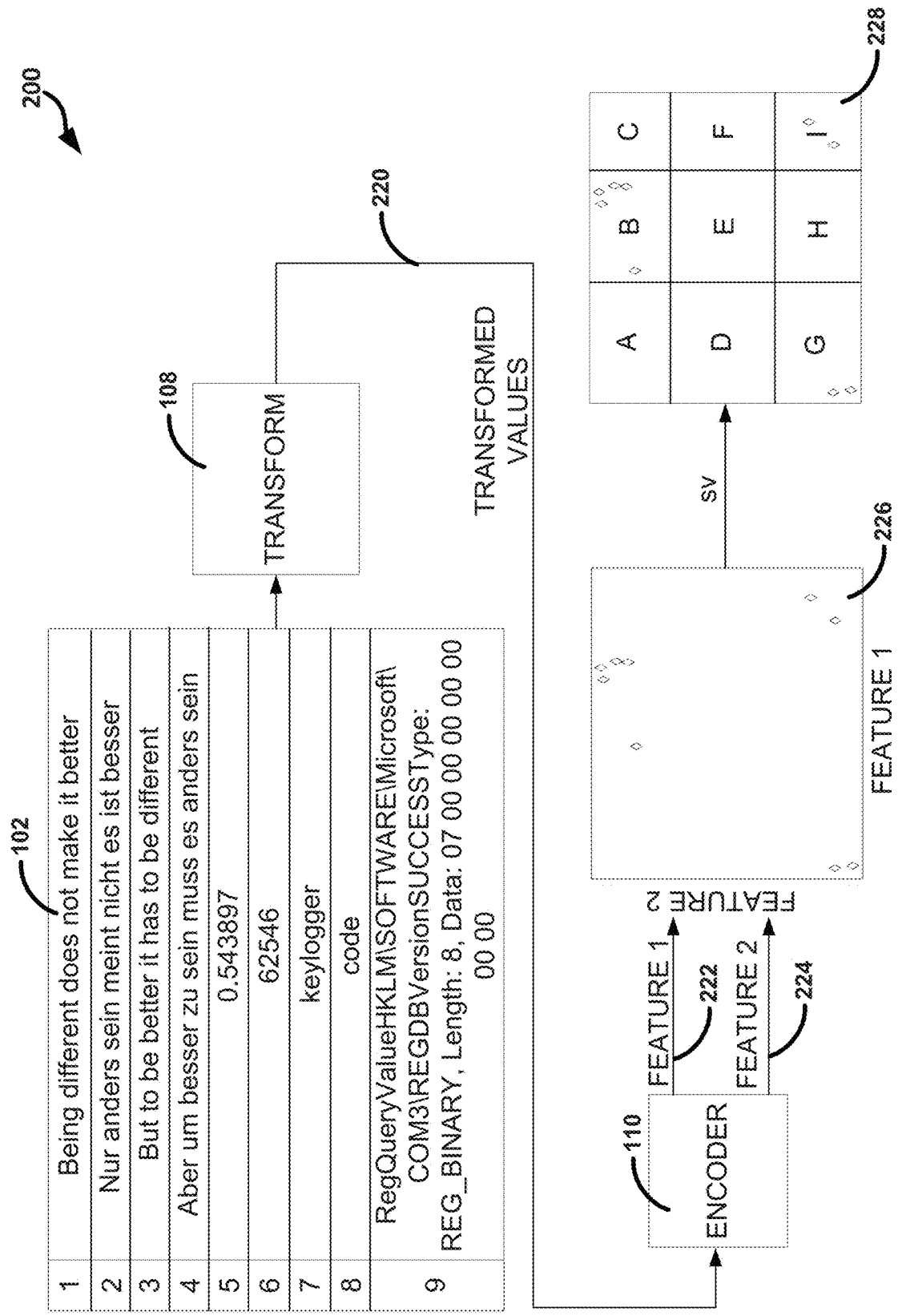
FIG. 2 illustrates, by way of example, a diagram of an embodiment of a method for identifying an anomalous behavior.

FIG. 2 illustrates, by way of example, a diagram of an embodiment of a method 200 for identifying an anomalous behavior. The method 200 as illustrated includes receiving the input 102. The input 102 in FIG. 2 includes nine text strings labelled "1"-"9". Each of the text strings "1"-"9" of the input 102 is respectively transformed to transformed values 220 at operation 108. An example transformation is ASCII encoding which transforms text to numerical values.

The transformed values 220 can be used to perform the operation 110. The operation 110 can include determining two features 222, 224 of the input 102 and plotting them against each other to form a feature graph 226. The features 222, 224 can include, for example, RM, RS, SM, SS, TM, and TS, in some embodiments.

Consider the input data item "1". Each character of the input data item "1" can be transformed to an ASCII value. The features can be determined based on the ASCII encoding of the entire string. That is, Xi, is the ASCII value of each character and the features are determined over all ASCII encodings of the characters of the input data item "1". As an example, the resultant RM can be feature 1 222 and the resultant RS can be feature 2 224, or vice versa. This is merely an example and any order-dependent feature can be chosen for feature 1 and any order-dependent feature chosen for feature 2. Each of the input data items "1"-"9" can be processed in this manner at operation 108 and 110.

The graph 226 can then be split into cells to form a grid 228. The cells of FIG. 2 are labelled "A"-"I" for illustration (we will introduce Key Values to numerically label the SV grid cells in Equation 16). Inputs 102 mapped to a same cell can be considered similar. Inputs 102 mapped to an empty cell can be considered anomalous. In the grid 228, input data items "1"-"4" (sentences in English and German) are mapped to cell "B", input data items 5-6 (numbers) are mapped to cell "I", and input data items "7-8" (words) are mapped to cell "G". Input data item 9, which is a combination of words, numbers, and other characters, maps to cell "B" indicating that input data item "9" is more like a sentence than a word or number. If a subsequent input data item 102 were to be received and mapped to cell "A", "C", "D", "E", "F", or "H" it can be deemed anomalous, as it is a behavior that has not been received before and is sufficiently different from other behaviors that have been seen previously.

Figure 3:
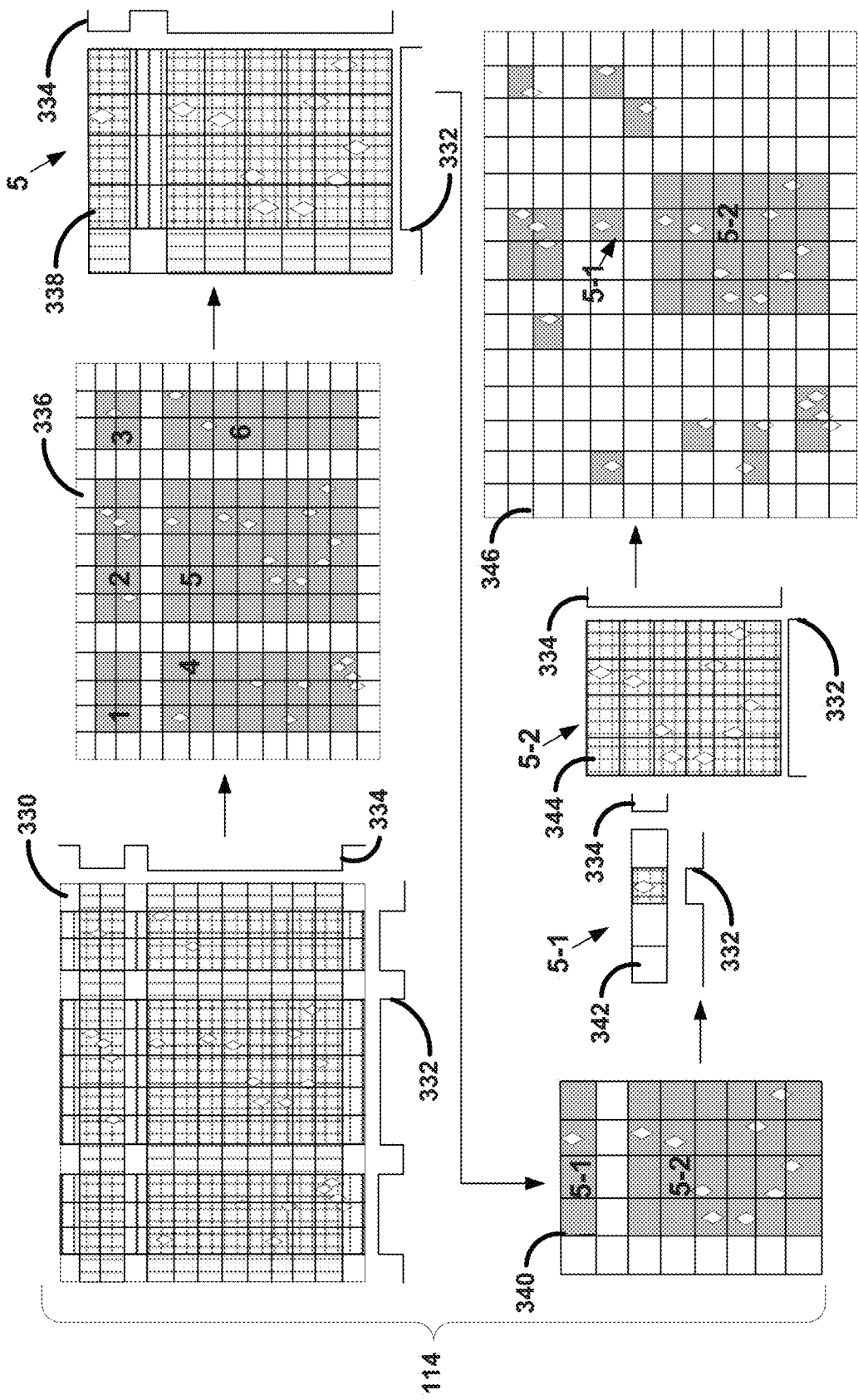
FIG. 3 illustrates, by way of example, a diagram of an embodiment of a grouping operation.

FIG. 3 illustrates, by way of example, a diagram of an embodiment of the operation 114. Encoded inputs ((x, y) points) are represented by diamonds. The operation 114 (sometimes called shadowing for group extraction) can include an iterative process that identifies cells that are populated and aggregates and separates those cells into groups. The iterative process can include:
1) Identifying cells of columns with at least one populated cell at operation 332 (indicated by horizontal hashing in graph 330)
2) Identifying cells of rows with at least one populated cell at operation 334 (indicated by vertical hashing in graph 330)
3) For each cell identified at both (1) and (2) (indicated by cross-hashing in the cell), (a) aggregate with all contiguous cells identified at both (1) and (2), (b) assign aggregated cells to a group, and (c) label the group with a key
4) Repeat (1)-(3) for each group/sub-group until no change.

A graph 336 illustrates the result of a first iteration of performing the operations (1)-(3). After the first iteration, six groups "1"-"6" in FIG. 3 are formed. Next each of the groups "1"-"6" are processed by operations (1)-(3). In FIG. 3, the second iteration is illustrated for group "5". The operations 332 and 334 can be performed on a sub-grid 338 formed by the cells of group "5". A graph 340 illustrates the result of the second iteration of performing the operations (1)-(3). After a second iteration on group "5", two sub-groups "5-1" and "5-2" are formed in the example of FIG. 3.

In the example of FIG. 3, a third iteration of the operations (1)-(3) is performed on the subgroups "5-1" and "5-2". The operations 332 and 334 can be performed on sub-grids 342, 344 formed by the cells of sub-groups "5-1" and "5-2". A graph 346 illustrates the result of the performing all iterations of the operations (1)-(3) and the groups formed therefrom.

As can be seen, whether an input is considered an anomaly is dependent on a size of a cell. The size of the cell can be chosen or configured according to an operational constraint, such as a size of a memory, compute bandwidth, or the like. The size of a cell can be chosen or configured according to a desired level of security. For example, a higher level of security can include more cells, but require more memory and compute bandwidth to operate, while a lower level of security can include fewer cells but require less memory and bandwidth to operate.

In some embodiments, the number of cells can be adaptive, such as to be adjusted during runtime as previously discussed. Related to this adaptive cell size is determining the location of an encoded input in the grid and a corresponding key value associated with the encoded input. An example of determining the location in the grid includes using the following equations (for an embodiment in which feature 1 is plotted on the x-axis and feature 2 is plotted on the y-axis):

$$\text{Col}=\text{int}((\text{feature } 1-x \text{ min})*(\text{num. col}-1)/(x \text{ range})) \qquad \text{Equation 14}$$

$$\text{Row}=\text{int}((\text{feature } 2-y \text{ min})* (\text{num. row}-1)/(y \text{ range})) \qquad \text{Equation 15}$$

An encoding on the grid, sometimes called key value, can be determined using Equation 16:

$$\text{Key Value}=\text{num. row}*\text{Row}+\text{Col} \qquad \text{Equation 16}$$

The "x min", "y min", "x max", and "y max" can be stored in the memory 116. Other values that can be stored in the memory 116 and relating to the grid of cells include "max grid size", "min grid size", or the like. These values can be used by the processing circuitry 104 to determine "x range", "num. col.", "y range", or "num. row", such as to assemble the grid of cells or determine a key value for a given encoded input (e.g., (feature 1, feature 2)).

A series of key values representing sequential inputs can be stored in the memory 116 and used by the classifier circuitry 106, such as to detect malicious (not necessarily anomalous) behavior. A malicious or other behavior of interest can be operated on by the processing circuitry 104 and the key values of the behavior can be recorded. The key values can be stored and associated with the malicious behavior. Key values subsequently generated by the processing circuitry 104 can be compared to the key values associated with the malicious behavior to detect the malicious behavior in the future.

Figure 4:
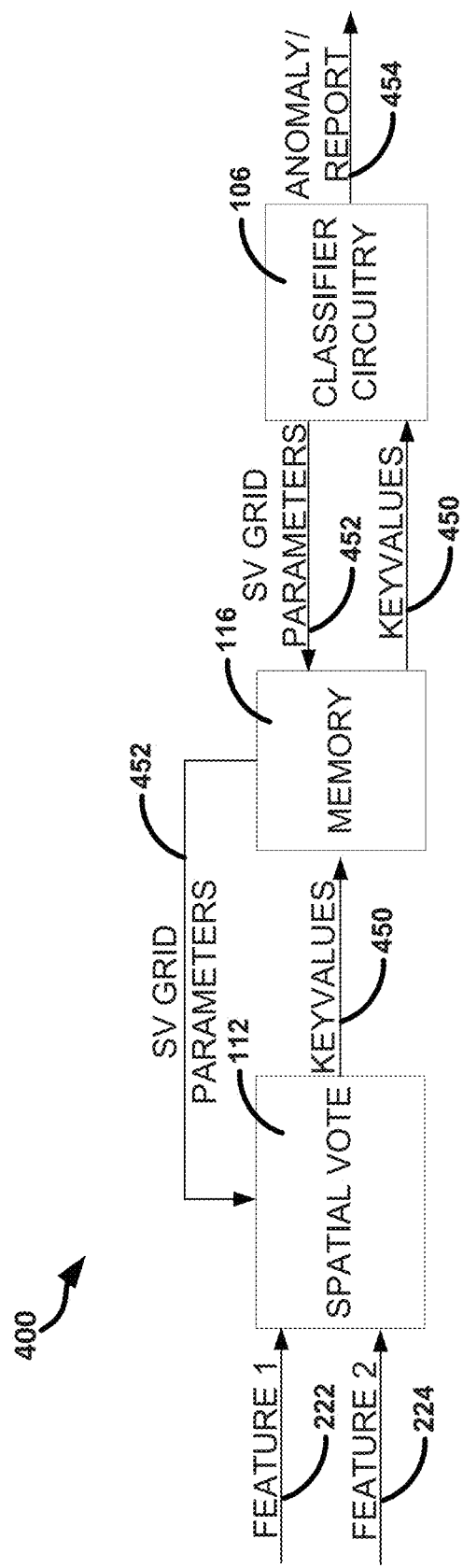
FIG. 4 illustrates, by way of example, a diagram of an embodiment of a system for anomaly detection.

FIG. 4 illustrates, by way of example, a diagram of an embodiment of a system 400 for anomaly detection. The system 400 includes an exploded view diagram of a portion of the system 100. The system 400 as illustrated includes the operation 112 of the processing circuitry 104, the memory 116, and the classifier circuitry 106. The operation 112 determines key values 450 based on SV grid parameters 452 from the memory 116 and features 222, 224 determined by the processing circuitry 104.

The key values in the memory 116 can allow for F-testing, t-testing, or Z-score analysis, such as by the classifier circuitry 106. These analyses can help identify significant columns and cells. The classifier circuitry 106 can provide event and pre-event logs in a report 454, such as for further analysis. The report 454 can provide information on which column or cell corresponds to the most different behavior.

Figure 5:
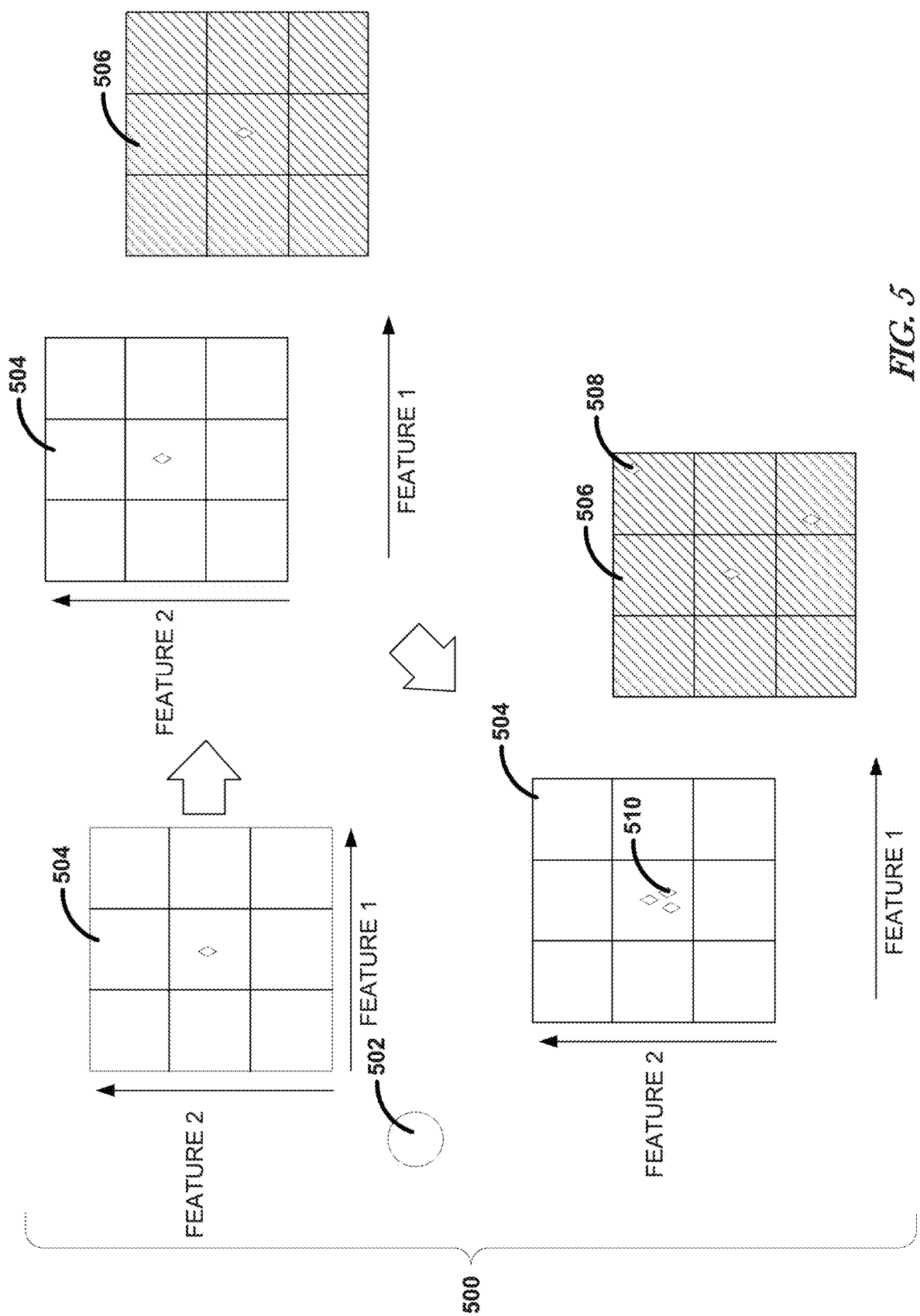
FIG. 5 illustrates, by way of example, a diagram of an embodiment of a method for generating an SV grid using adaptive auto grouping (AAG).

FIG. 5 illustrates, by way of example, a diagram of an embodiment of a method 500 for generating an SV grid using adaptive auto grouping (AAG). The method 500 is different than the methods discussed previously in that a maximum extent of the SV grid is not defined a priori and the SV grid generated using the method 500 need not be continuous in extent. Using the method 500, only portions of the SV grid that include an input mapped thereto are defined. If an input is mapped to a portion of the SV grid that has not yet been defined, a new portion of the SV grid is defined to accommodate the input.

An origin 502 is chosen and defined. A size of a cell (e.g., extent in feature 1 direction and extent in feature 2 direction), a number of rows of cells, and a number of columns of cells in a group can be defined. The origin 502 can be defined at a point to which an input cannot be mapped. For example, if feature 1 is strictly a positive number, the origin can be defined at a negative value for feature 1. The origin 502 provides a relative location from which the remainder of the SV grid can be defined or determined.

An input can then be received and processed, such as by performing operations 108, 110, and 112 (see FIG. 1). The cell to which the first input is mapped on the SV grid is defined as a cell in the center of a first group of cells 504 which can have an odd number of rows and an odd number of columns, otherwise the first point would not represent the true center of the group and its extent. It can be preferred to define the SV grid for a group of cells 504 so that the SV grid is symmetric in feature 1 and in feature 2 in terms of the number of cells in each axis, although the extent or size of each cell in feature 1 and in feature 2 do not necessarily have to be the equal. The cell of the group of cells 504 to which the first input mapping into the group is defined as the center cell for the group of cells 504. The group of cells 504 can include an odd number of rows of cells and an odd number of columns of cells. The number of rows of cells can be the same or different as the number of columns of cells. Each subsequent group can include the same size (same cell extent and number of cells), although this is not a required condition.

A next input can be received and processed, such as by performing operations 108, 110, and 112. If the input is mapped to a cell of the first group of cells 504, no additional cells are defined, and the key value of the cell to which the next input is mapped can be recorded. The group of cells 504 can be associated with a group number (e.g., a positive integer). The first group formed can be assigned group number 1, the second group formed can be assigned group number 2, and so on. Other numbering conventions are possible.

If the next input is mapped to a location outside the group of cells 504, a new group of cells 506 can be defined and the input mapped thereto can be declared anomalous. The cell to which the next input is mapped on the SV grid can be defined as a center cell of the next group of cells 506. The group of cells 506 must have an odd number of rows and an odd number of columns. The group of cells 506 can include a same or different number of rows, columns, and cells as the group of cells 504. A group number associated with the next group of cells 506 can be incremented by one from the group number associated with the immediately preceding group of cells.

Subsequent inputs can be mapped to the SV grid that is defined by the groups of cells. An input that is mapped within a group, but to a cell of the group that does not currently include an input mapped thereto can be declared anomalous. Each anomalous input can be recorded (e.g., the raw input or the values of feature 1 and feature 2) along with a group and cell number to which the input is mapped. For example, the input 508 can be deemed anomalous since it is mapped to a cell of the second group and that cell had not previously had an input mapped thereto. In contrast, the input 510 can be declared recognized since it is mapped to a cell of the first group and that cell has previously had an input mapped thereto. A count of a cell to which a recognized input is mapped can be incremented.

Figure 6:
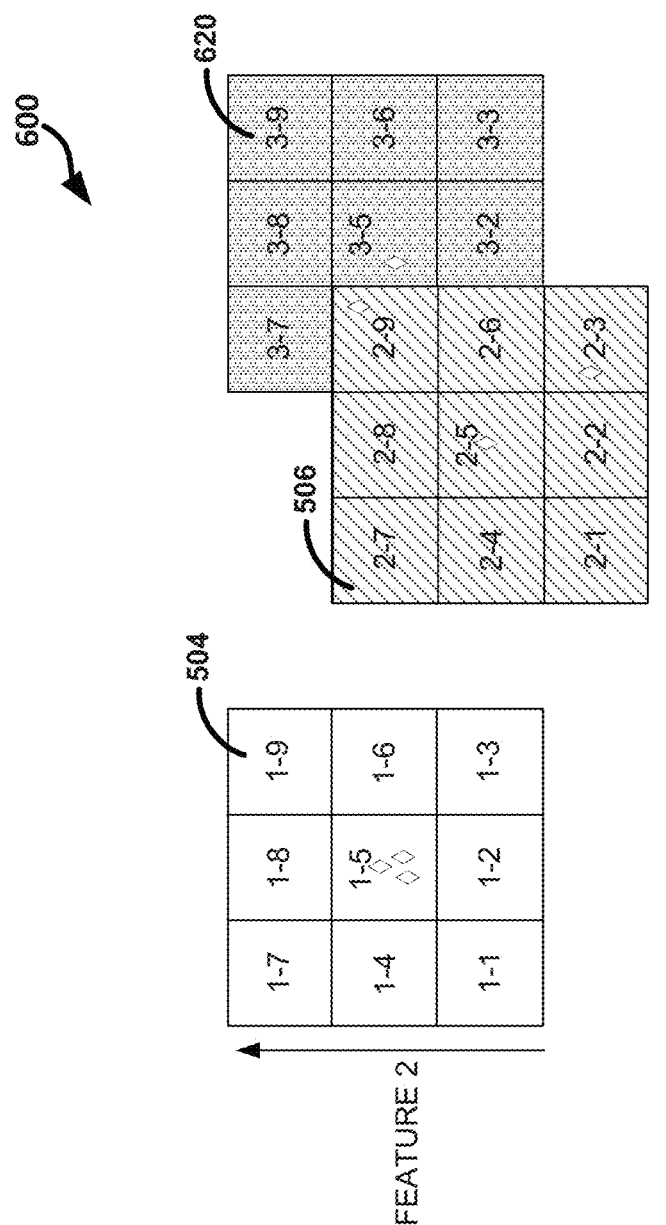
FIG. 6 illustrates, by way of example, a diagram of an embodiment of an SV grid that includes the SV grids of FIG. 5 after a seventh input is mapped thereto.

FIG. 6 illustrates, by way of example, a diagram of an embodiment of an SV grid 600 that includes the SV grids of FIG. 5 after a seventh input is mapped thereto. The SV grid 600 includes three groups of cells 504, 506, and 620. The group 620 is formed in the same manner as the second group of cells 506, except the group 620 overlaps with the second group of cells 506. In such a situation, embodiments can use a heuristic to determine to which group the cells that overlap belong. In the embodiment of FIG. 6, the heuristic is that the cells do not change group. Once the cells are a member of the group of cells 506, they remain part of the group of cells 506. This means that the effective extent of the third group is smaller than the extent of the first and second groups of cells 504, 506. The term "effective extent" means that the cells that overlap remain part of both groups, but anything mapped to one of these cells in the overlap is considered part of the group that was formed first. It further means that the key values of the cells of the group 620 will not perfectly mirror the key values of the cells of the groups of cells 504, 506. The key values for the first group of cells 504 are illustrated at 1-1, 1-2, 1-3, . . . , 1-9. The key values for the second group of cells 506 are similarly 2-1, 2-2, 2-3, . . . , 2-9. The key values for the third group are similar, but do not include 3-1 and 3-4, as those cells are part of the second group of cells 506. The labelling of the key values is arbitrary, but labelling them as [group, cell] as in FIG. 6 can help save memory space over alternative labels.

An alternative labelling that is just as efficient as the one illustrated in FIG. 6 can include labelling the cells in numeric order regardless of position in the group. This labelling scheme would change "3-2" to "3-1", "3-3" to "3-2", "3-5" to "3-3" and so on. Note that while cells are numbered in increasing order from left to right and bottom to top, another numbering scheme can be used, such as increasing from top to bottom, increasing from right to left, a combination thereof, or the like.

The SV grid 600 of FIG. 6 can be defined as:
[origin, cell extent, number of cells in group, group 1 center, group 2 center, group 3 center] where the origin is the relative location to which other points in the SV grid 600 are defined, the cell extent indicates the distance in both feature directions a cell occupies, the number of cells in the group indicates a number of rows and columns of cells for each group (assuming non-overlapping), and group 1 center, group 2 center, and group 3 center indicate the center cell from which the remainder of the group can be inferred by the cell extent and number of cells in the group.

For each group, each cell to which an input has been mapped can be recorded. Each cell to which an input was not previously mapped can be recorded and reported or reported in real-time. An efficient group description can include a run length encoding (RLE) of the group. The RLE encoding can include a row RLE, a column RLE, and a column specific RLE (or row specific RLE) for each column (or row) with at least one input mapped thereto. For the group of cells 506, the RLE encoding can include row RLE {1, 3}, column RLE {0, 1, 2}, and column specific RLEs {0, 1, 1}, {1, 1, 1}. The row RLE {1, 3} indicates that there is at least one cell in each of the three rows that includes an input mapped thereto. The column RLE {0, 1, 2,} indicates that the first column of the group includes no inputs mapped thereto and that the remaining two columns include at least one input mapped thereto. The first column specific RLE {0, 1, 1} indicate that the first column with an input mapped thereto includes a first cell without an input mapped thereto, a second cell with an input mapped thereto, and the remaining cells of the column do not have an input mapped thereto. The second column specific RLE {1, 1, 1} indicates that a first cell of the column includes an input mapped thereto, a second cell of the column does not include an input mapped thereto, and that the remaining cells of the column include an input mapped thereto.

FIG. 7 illustrates, by way of example, a diagram of an embodiment of a behavior transition matrix 700. The behavior transition matrix 700 is similar to a Markov model, but is provided empirically and based on the groups to which consecutive inputs are actually mapped. The behavior transition matrix indicates how likely it is, that a next input is mapped to a group v given that the current input is mapped to group w, where v is a member of the set of all groups and w is a member of the set of all groups of the SV grid. The behavior transition matrix 700 can be generated using little processing and memory overhead and can be updated in real time.

The behavior transition matrix 700 is for the SV grid 600. Based on the seven mapped inputs of the SV grid 600, there is a one third chance that the next input will be mapped to each of the respective groups of cells 504, 506, and 620. According to the behavior transition matrix 700 there is a zero percent chance that, if an input is currently mapped to group 1 (the group of cells 504), the next input will be mapped to group 3 (the group 620). If such a transition is noticed, and even if the cell to which the input is mapped in group 3 is recognized (has had an input mapped thereto previously), an anomaly can be declared as the behavior of consecutive groups has not been seen before. Similarly, if a transition between groups is rare (e.g., below a specified probability, such as less than 0.50. 0.45, 0.40, 0.35, 0.30, 0.25, 0.20, 0.15, 0.10, 0.05, 0.01, some probability therebetween, or less than 0.01), it is not an anomaly since it has been seen before, but nonetheless it can be reported as potentially bad behavior.

Embodiments can determine a Gaussian Mixture Model (GMM) for a given group. The GMM of a given group can be used to help determine a probability of a given input being an anomaly. The GMM of a given group can also help determine a probability that a mapped input is a member of a group.

For example, consider the mapped inputs in cell 1-5, and the mapped inputs in cells 2-5 and 2-9 of the SV grid 600 of FIG. 6. It is more likely that the inputs mapped to the cell 1-5 are accurately in the same group (group of cells 504) than the inputs mapped to the cells 2-5 and 2-9. This is because of the proximity of the points and the tendency of encoding inputs into the SV grid 600 to clump like behaviors. It could be more likely that the point in cell 2-9 is a member of the group 620 than the group of cells 506. This highlights a tradeoff between simplicity in forming groups and the SV grid and getting the group membership correct. If it is more important that the group membership be correct, more processor bandwidth will be required to re-group cells (or mapped inputs) and maintain an accounting for the proper group membership. In many applications, however, it is sufficient to have less accurate group membership in the reporting and account for the improper group membership with post-processing (sometimes called classification).

Using techniques of embodiments can simplify a GMM calculation for a given group. A GMM is generally calculated using the transcendental exponential function. For example, a standard 2D Gaussian equation is given by Equation 17:

$$\text{Probability of point}(x, y) \text{ in group } z = e^{-0.5*\left(\frac{(x-xc)^2}{\text{sign } x} + \frac{(y-yc)^2}{\text{sign } y}\right)} \quad \text{Equation 17}$$

Where x and y correspond to the values of feature 1 and feature 2 to which the input maps, xc and yc are the feature 1 and feature 2 values of the center of the group z (e.g., the first point added to the group and about which the group was formed). Calculating the exponential function is complicated and prohibitively expensive for implementation on many lower bandwidth controllers. Equation 18 can be used as a quick, accurate approximation to the transcendental function of Equation 17:

$$\text{Probability of point } (x, y) \text{ in group } z = 1 - 0.2*((x-xc)*(x-xc)+(y-yc)*(y-yc)) \quad \text{Equation 18}$$

Where x, y, yc, and xc are defined as in Equation 17. The calculation of the GMM using Equation 18 is simpler and faster than calculating the GMM using Equation 17. The GMM can be determined on a smaller, simpler processing unit using Equation 18.

Figure 8:
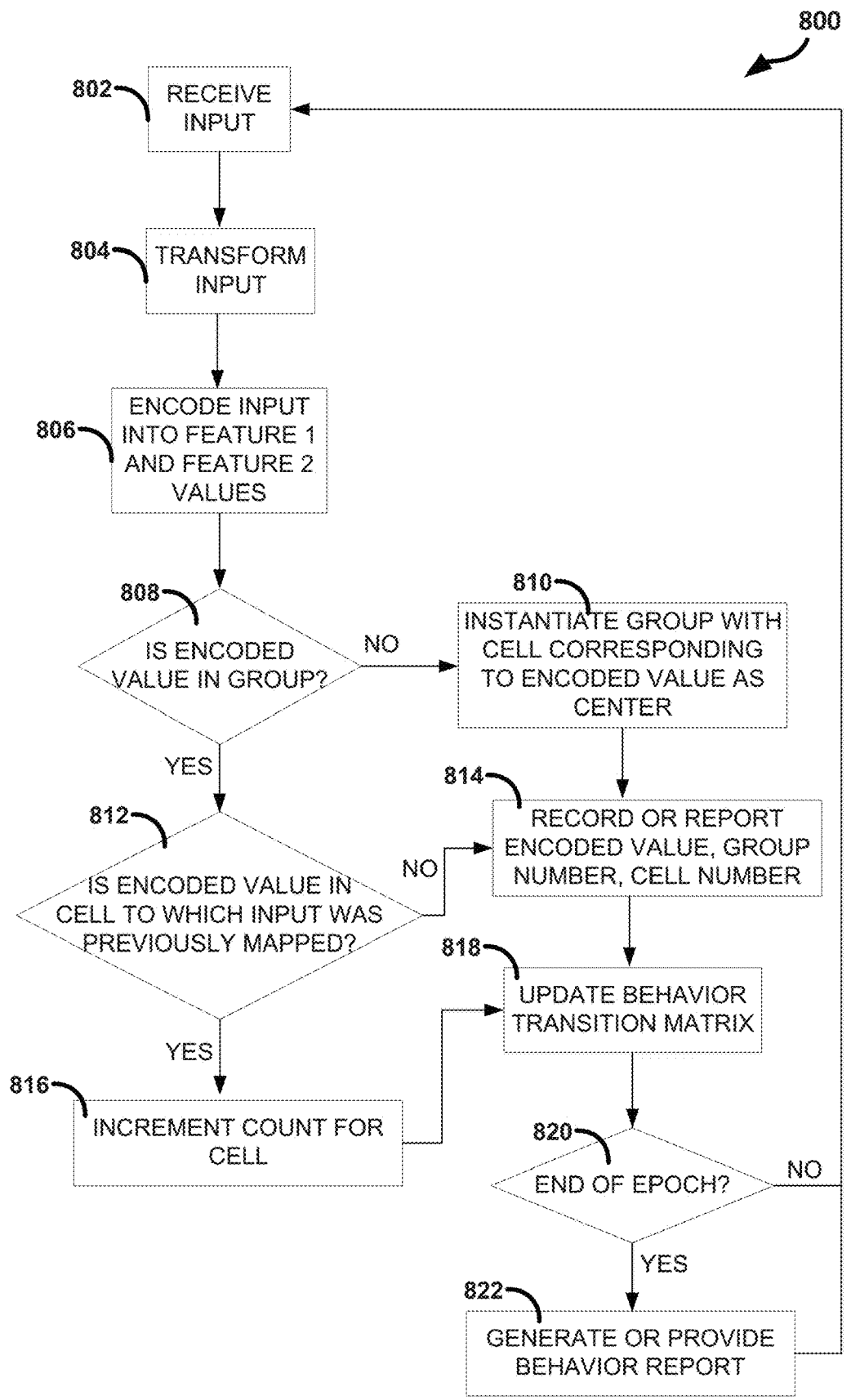
FIG. 8 illustrates, by way of example, a diagram of an embodiment of a method for behavior detection using AAG.

FIG. 8 illustrates, by way of example, a diagram of an embodiment of a method 800 for behavior detection using AAG. The method 800 as illustrated includes receiving an input, at operation 802. The input can be a file, packet, data stream, a portion thereof, or the like. The input can be transformed, at operation 804. The transformation at operation 804 can convert the input to a numerical value. One such transformation is an ASCII encoding of the input. The operation 804 may not be needed for numerical inputs, thus the operation 804 is optional.

The operation 806 includes encoding the transformed (or untransformed) input into two feature values, feature 1 and feature 2. As previously discussed, the feature values can include two different statistics on the same data or a same statistic on different (e.g., overlapping) data. The statistics, as previously discussed, can be order-dependent, such that the same numbers in a different order produce a different result for the given statistic.

It can be determined, at operation 808, whether the encoded value falls within a group extent of a group that is already defined in an SV grid. The operation 808 can include comparing the feature 1 value and the feature 2 value to a recorded extent of each group (e.g., in temporal or group number order). If the (feature 1, feature 2) falls outside of all groups, as determined at operation 808, a new group can be instantiated at operation 810. The new group can be instantiated to include an odd number of rows and an odd number of columns, such that the grid associated with the group includes a center cell. The cell to which the input is mapped can be at the center of the instantiated groups of cells. The mapped input can be recorded and used to determine the extent of the group (e.g., based on a cell size and a number of rows and columns of cells in the group).

If the encoded value is determined to fall within a group extent, at operation 808, it can be determined whether the encoded value is within a cell to which an input was previously mapped, at operation 812. After performing operation 810, or after determining, at operation 812, that the encoded value is not within a cell to which an input was previously mapped, data indicating the encoded value, group number, or cell number can be recorded or reported. The data can be reported in some embodiments that report more than at the end of each epoch. The data can be recorded in some embodiments that report at the end of each epoch. If the encoded value is determined, at operation 812, to fall within an extent of a cell to which an input was previously mapped, a count for the cell (indicating the number of inputs that have been mapped thereto) can be incremented at operation 816.

The operation 818 is illustrated as occurring after the operations 814 or 816. However, the operation 818 can occur before, after, or concurrently with the operations 808, 810, 812, 814, or 816. The operation 818 includes updating a behavior transition matrix, an example of such a matrix is provided in FIG. 7. At operation 820, it can be determined if an end of an epoch has been reached. An epoch can last a specified amount of time, until a specified time, a specified number of inputs, a specified number of detected anomalies, or a specified number of newly defined groups. If the end of the epoch is reached, as determined at operation 820, a behavior report can be updated, generated, or transmitted at operation 822. The behavior report can include an indication of new groups generated, anomalies and their associated cell numbers, encoded values, or the like, counts for each cell, the behavior transition matrix or a list indicating, in sequential order, groups to which each input was mapped for the epoch, parameters of the SV grid (e.g., cell extent, group extent (e.g., number of rows or columns of cells), or the like. In some embodiments, the SV grid can be offloaded to a child process, such as to start the child with the knowledge gained by the prior process regarding anomalous behavior.

AAG of embodiments uses a reference group defined from a single cell and achieves self-organizing grouping without respect to the reference SV group zero. AAG is capable of defining arbitrary numbers of groups on an unbounded 2D plane with finite amounts of memory. The memory can be off-loaded to progeny (a child). The memory can include new groups learned by the parent process. The memory offload can provide a sort of ancestral inheritance of new groups and old groups for reference groups. The AAG process of embodiments can scale to arbitrarily large bandwidth processing, can be distributed or implemented in a multithreaded fashion, and can organize large data spaces, like sensor output, into smaller important data chunks, such as for post processing.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA), graphics processing unit (GPU), or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The transformation of encoded data into a 2D representation forms an "image" of SV grid data. This image may be operated on using conventional image processing techniques including convolution operators, foreground background segmentation, edge detection, texture characterization, morphological image operators, and image algebra including affine transformations and projections, among others. The image format also enables optical processing and optical computer techniques to be applied enabling spatial matched filtering, holography, Fourier, Gabor, and wavelet transformation, optical neural network connectionist architecture representation, complementary metal oxide semiconductor (CMOS) focal plane array integrated monolithic hybrid meta-material structures (including but not limited to non-linear optically active crystals and nano-structures) to be used for encoding and reading out SV patterns as well as transforming and partitioning the data thereby represented using purely optical and meta-material embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, such as in a machine-readable medium for execution by, or to control the operation of, data processing apparatus, such as a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., an FPGA, GPU, ASIC, or optical computer or hybrid meta-material element.

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 9:
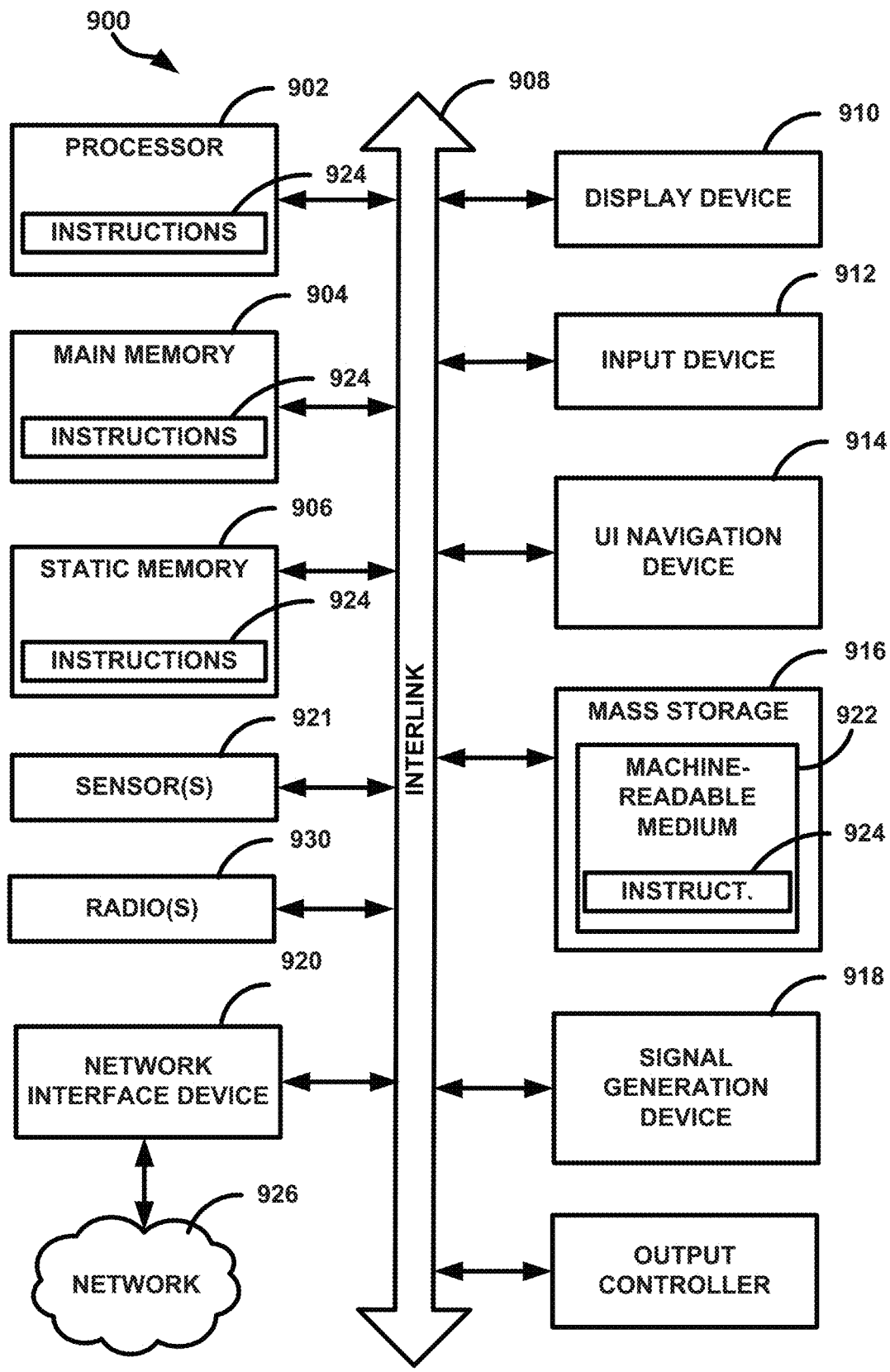
FIG. 9 illustrates, by way of example, a block diagram of an embodiment of a machine in the example form of a computer system within which instructions, for causing the machine to perform any one or more of the methodologies discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), a network interface device 920, and radios 930 such as Bluetooth, WWAN, WLAN, and NFC, permitting the application of security controls on such protocols.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks or hybrid meta-materials.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLE EMBODIMENTS

Example 1 includes an apparatus comprising a memory including data indicating spatial voting (SV) grid data, the SV grid data indicating an extent of each cell in a grid of cells, an odd number of rows of cells and an odd number of columns of cells in a group of cells, and, for each group of cells, a point in the center cell of the group of cells and a unique group number, processing circuitry coupled to the memory, the processing circuitry being configured to determine a first feature value and a second feature value of a series of numbers that, given the same numbers in a different order, produce a different value for the respective feature, identify whether the determined first feature value and the second feature value map to a cell of the grid of cells that is a part of a group based on the SV grid data, and in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

In Example 2, Example 1 further includes, wherein the processing circuitry is further configured to record a series of group numbers that includes group numbers of groups to which sequential series of numbers are mapped and in sequential order.

In Example 3, Example 2 further includes classifier circuitry configured to determine, based on the series of group numbers, whether a sequence of consecutive group numbers has not been experienced previously.

In Example 4, at least one of Examples 2-3 further includes, wherein the processing circuitry is further configured to update a behavior transition matrix in the memory based on the new group and an immediately previous group, the behavior transition matrix indicating, empirically, how likely it is that a given group will be detected next, given a current group number.

In Example 5, Example 4 further includes, wherein the processing circuitry is further configured to determine, based on the behavior transition matrix, whether the likelihood that the transition from an immediately previous group to a current group is less than a specified threshold, and record the input for reporting in response to determining the likelihood is less than the specified threshold.

In Example 6, at least one of Examples 1-5 further includes, wherein the group numbers are in ascending order with a group generated earlier in time including a lower group number.

In Example 7, Example 6 further includes, wherein identifying whether the determined first feature value and the second feature value map to a cell of the grid of cells that is a part of a group based on the SV grid data includes comparing the first feature value and the second feature value to an extent of the group with the lowest group number to the extent of the highest group number, in order until a group to which the first feature value and the second feature value maps is identified or it is determined that the first feature value and the second feature value do not map to the group with the highest group number.

In Example 8, at least one of Examples 1-7 further includes, wherein the processing circuitry is further configured to determine whether an epoch has ended, and in response to determining the epoch has ended, generating and providing a behavior report to classifier circuitry, wherein the behavior report includes each group and corresponding group number, and center point and an order in which each group was detected.

Example 9 includes at least one non-transitory machine-readable medium including instructions that, when executed by a machine, cause the machine to perform operations comprising determining a first feature value and a second feature value of a series of numbers that, given the same numbers in a different order, produce a different value for the respective feature, identifying whether the determined first feature value and the second feature value map to a cell of a grid of cells that is a part of a group based on spatial voting (SV) grid data in a memory of the machine, the SV grid data indicating an extent of each cell in a grid of cells, an odd number of rows of cells and an odd number of columns of cells in a group of cells, and, for each group of cells, a point in the center cell of the group of cells and a unique group number, and in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

In Example 10, Example 9 further includes, wherein the operations further comprise recording a series of group numbers that includes group numbers of groups to which sequential series of numbers are mapped and in sequential order.

In Example 11, Example 10 further includes, wherein the operations further include determining, based on the series of group numbers, whether a sequence of consecutive group numbers has not been experienced previously.

In Example 12, Example 11 further includes, wherein the operations further include updating a behavior transition matrix in the memory based on the new group and an immediately previous group, the behavior transition matrix indicating, empirically, how likely it is that a given group will be detected next, given a current group number.

In Example 13, Example 12 further includes, wherein the operations further include determining, based on the behavior transition matrix, whether the likelihood that the transition from an immediately previous group to a current group is less than a specified threshold, and recording the input for reporting in response to determining the likelihood is less than the specified threshold.

In Example 14, at least one of Examples 9-13 further includes, wherein the group numbers are in ascending order with a group generated earlier in time including a lower group number.

In Example 15, Example 14 further includes, wherein identifying whether the determined first feature value and the second feature value map to a cell of the grid of cells that is a part of a group based on the SV grid data includes comparing the first feature value and the second feature value to an extent of the group with the lowest group number to the extent of the highest group number, in order until a group to which the first feature value and the second feature value maps is identified or it is determined that the first feature value and the second feature value do not map to the group with the highest group number.

Example 16 includes a method for device behavior anomaly detection, the method comprising determining a first feature value and a second feature value of a series of numbers that, given the same numbers in a different order, produce a different value for the respective feature, identifying whether the determined first feature value and the second feature value map to a cell of a grid of cells that is a part of a group based on spatial voting (SV) grid data in a memory of the machine, the SV grid data indicating an extent of each cell in a grid of cells, an odd number of rows of cells and an odd number of columns of cells in a group of cells, and, for each group of cells, a point in the center cell of the group of cells and a unique group number, and in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

In Example 17, Example 16 further includes determining whether an epoch has ended, and in response to determining the epoch has ended, generating and providing a behavior report to classifier circuitry, wherein the behavior report includes each group and corresponding group number, and center point and an order in which each group was detected.

In Example 18, at least one of Examples 16-17 further includes recording a series of group numbers that includes group numbers of groups to which sequential series of numbers are mapped and in sequential order.

In Example 19, Example 18 further includes determining, based on the series of group numbers, whether a sequence of consecutive group numbers has not been experienced previously.

In Example 20, Example 19 further includes updating a behavior transition matrix in the memory based on the new group and an immediately previous group, the behavior transition matrix indicating, empirically, how likely it is that a given group will be detected next, given a current group number.

In Example 21, Example 20 further includes determining, based on the behavior transition matrix, whether the likelihood that the transition from an immediately previous group to a current group is less than a specified threshold, and recording the input for reporting in response to determining the likelihood is less than the specified threshold.

In Example 22, at least one of Examples 16-21 further includes, wherein the group numbers are in ascending order with a group generated earlier in time including a lower group number.

In Example 23, Example 22 further includes, wherein identifying whether the determined first feature value and the second feature value map to a cell of the grid of cells that is a part of a group based on the SV grid data includes comparing the first feature value and the second feature value to an extent of the group with the lowest group number to the extent of the highest group number, in order until a group to which the first feature value and the second feature value maps is identified or it is determined that the first feature value and the second feature value do not map to the group with the highest group number.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus comprising:
 a memory including spatial voting (SV) grid data, the SV grid data identifying an extent of each cell in a grid of cells, an odd number of rows of cells and an odd number of columns of cells in a group of cells, and, for each group of cells, a point in the center cell of the group of cells and a unique group number;
 processing circuitry coupled to the memory, the processing circuitry being configured to:
 determine a first feature value and a second feature value of a series of numbers that, given the same numbers in a different order, produce a different value for the respective feature;
 identify, based on the SV grid data, whether the determined first feature value and the second feature value map to a cell of the grid of cells that is a part of a group; and
 in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

2. The apparatus of claim 1, wherein the processing circuitry is further configured to record a series of group numbers that includes group numbers of groups to which sequential series of numbers are mapped and in sequential order.

3. The apparatus of claim 2, further comprising classifier circuitry configured to determine, based on the series of group numbers, whether a sequence of consecutive group numbers has not been experienced previously.

4. The apparatus of claim 2, wherein the processing circuitry is further configured to update a behavior transition matrix in the memory based on the new group and an immediately previous group, the behavior transition matrix indicating, empirically, how likely it is that a given group will be detected next, given a current group number.

5. The apparatus of claim 4, wherein the processing circuitry is further configured to:
   determine, based on the behavior transition matrix, whether the likelihood that the transition from an immediately previous group to a current group is less than a specified threshold; and
   record the input for reporting in response to determining the likelihood is less than the specified threshold.

6. The apparatus of claim 1, wherein the group numbers are in ascending order with a group generated earlier in time including a lower group number.

7. The apparatus of claim 6, wherein identifying whether the determined first feature value and the second feature value map to a cell of the grid of cells that is a part of a group based on the SV grid data includes comparing the first feature value and the second feature value to an extent of the group with the lowest group number to the extent of the highest group number, in order until a group to which the first feature value and the second feature value maps is identified or it is determined that the first feature value and the second feature value do not map to the group with the highest group number.

8. The apparatus of claim 1, wherein the processing circuitry is further configured to determine whether an epoch has ended, and in response to determining the epoch has ended, generating and providing a behavior report to classifier circuitry, wherein the behavior report includes each group and corresponding group number, and center point and an order in which each group was detected.

9. At least one non-transitory machine-readable medium including instructions that, when executed by a machine, cause the machine to perform operations comprising:
   determining a first feature value and a second feature value of a series of numbers that, given the same numbers in a different order, produce a different value for the respective feature;
   identifying, based on spatial voting (SV) grid data in a memory of the machine, whether the determined first feature value and the second feature value map to a cell of a grid of cells that is a part of a group, the SV grid data identifying an extent of each cell in a grid of cells, an odd number of rows of cells and an odd number of columns of cells in a group of cells, and, for each group of cells, a point in the center cell of the group of cells and a unique group number; and
   in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

10. The at least one non-transitory machine-readable medium of claim 9, wherein the operations further comprise recording a series of group numbers that includes group numbers of groups to which sequential series of numbers are mapped and in sequential order.

11. The at least one non-transitory machine-readable medium of claim 10, wherein the operations further include determining, based on the series of group numbers, whether a sequence of consecutive group numbers has not been experienced previously.

12. The at least one non-transitory machine-readable medium of claim 11, wherein the operations further include updating a behavior transition matrix in the memory based on the new group and an immediately previous group, the behavior transition matrix indicating, empirically, how likely it is that a given group will be detected next, given a current group number.

13. The at least one non-transitory machine-readable medium of claim 12, wherein the operations further include:
   determining, based on the behavior transition matrix, whether the likelihood that the transition from an immediately previous group to a current group is less than a specified threshold; and
   recording the input for reporting in response to determining the likelihood is less than the specified threshold.

14. The at least one non-transitory machine-readable medium of claim 9, wherein the group numbers are in ascending order with a group generated earlier in time including a lower group number.

15. The at least one non-transitory machine-readable medium of claim 14, wherein identifying whether the determined first feature value and the second feature value map to a cell of the grid of cells that is a part of a group based on the SV grid data includes comparing the first feature value and the second feature value to an extent of the group with the lowest group number to the extent of the highest group number, in order until a group to which the first feature value and the second feature value maps is identified or it is determined that the first feature value and the second feature value do not map to the group with the highest group number.

16. A method for device behavior anomaly detection, the method comprising:
   determining a first feature value and a second feature value of a series of numbers that, given the same numbers in a different order, produce a different value for the respective feature;
   identifying, based on spatial voting (SV) grid data in a memory, whether the determined first feature value and the second feature value map to a cell of a grid of cells that is a part of a group, the SV grid data identifying an extent of each cell in a grid of cells, an odd number of rows of cells and an odd number of columns of cells in a group of cells, and, for each group of cells, a point in the center cell of the group of cells and a unique group number; and
   in response to identifying that the determined first feature value and the second feature value do not map to a cell of the grid of cells that is a part of a group, storing the first feature value and the second feature value as a center point for a new group of cells in the memory and tagging the first feature value and the second feature value as corresponding to an anomalous behavior.

17. The method of claim 16, further comprising determining whether an epoch has ended, and in response to determining the epoch has ended, generating and providing a behavior report to classifier circuitry, wherein the behavior report includes each group and corresponding group number, and center point and an order in which each group was detected.

18. The method of claim 16, wherein the method further comprises recording a series of group numbers that includes group numbers of groups to which sequential series of numbers are mapped and in sequential order.

19. The method of claim 18, further comprising determining, based on the series of group numbers, whether a sequence of consecutive group numbers has not been experienced previously.

20. The method of claim 19, further comprising:
updating a behavior transition matrix in the memory based on the new group and an immediately previous group, the behavior transition matrix indicating, empirically, how likely it is that a given group will be detected next, given a current group number;
determining, based on the behavior transition matrix, whether the likelihood that the transition from an immediately previous group to a current group is less than a specified threshold; and
recording the input for reporting in response to determining the likelihood is less than the specified threshold.

* * * * *